(12) United States Patent
Shih et al.

(10) Patent No.: US 7,326,077 B2
(45) Date of Patent: Feb. 5, 2008

(54) FIXING DEVICE FOR AN EXTENSION CARD

(75) Inventors: Ying-Hui Shih, Chung Ho (TW); Yue-Wen Jiang, Chia-I Hsien (TW)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 11/334,496

(22) Filed: Jan. 19, 2006

(65) Prior Publication Data

US 2007/0167064 A1    Jul. 19, 2007

(51) Int. Cl.
*H01R 13/64* (2006.01)
(52) U.S. Cl. ...................................... 439/372
(58) Field of Classification Search ................ 361/686, 361/737, 740, 801, 802; 439/372
See application file for complete search history.

(56) References Cited

U.S. PATENT DOCUMENTS

| | | | | |
|---|---|---|---|---|
| 5,757,618 A | * | 5/1998 | Lee | ............................ 361/686 |
| 5,967,466 A | * | 10/1999 | Osborne et al. | ........... 248/27.1 |
| 6,138,839 A | * | 10/2000 | Cranston et al. | ......... 211/41.17 |
| 6,287,138 B1 | * | 9/2001 | Kuang | .......................... 439/372 |
| 6,480,392 B1 | * | 11/2002 | Jiang | ........................... 361/755 |
| 6,552,913 B2 | * | 4/2003 | Tournadre | ................... 361/759 |
| 6,608,765 B2 | * | 8/2003 | Vier et al. | ................... 361/801 |
| 6,693,802 B2 | * | 2/2004 | Vier et al. | ................... 361/801 |
| 6,738,261 B2 | * | 5/2004 | Vier et al. | ................... 361/740 |
| 6,937,467 B2 | * | 8/2005 | Hsu | ............................ 361/686 |
| 6,937,481 B1 | * | 8/2005 | Newman et al. | ............ 361/801 |
| 6,972,370 B2 | * | 12/2005 | Wang et al. | ................. 174/535 |
| 2007/0167064 A1 | * | 7/2007 | Shih et al. | ................... 439/372 |

* cited by examiner

*Primary Examiner*—James R. Harvey
(74) *Attorney, Agent, or Firm*—Rabin & Berdo, P.C.

(57) ABSTRACT

A fixing device for an extension card having a bracket with a bent portion has a casing and a metal pressing member. The casing has a support portion. The metal pressing member has a longitudinal bottom plate, a pivotal structure, and a resilient latching structure. The pivotal structure is pivotally connected to the casing. The bent portion of the bracket of the extension card is placed on the support portion of the casing. The longitudinal bottom plate of the metal pressing member presses on the bent portion. The resilient latching structure of the metal pressing member detachably latches onto the casing. As a result, the extension card is capable of being retained in or dismounted from the casing easily and quickly.

19 Claims, 9 Drawing Sheets

FIXING DEVICE FOR AN EXTENSION CARD

BACKGROUND OF THE INVENTION

1. Field of the Invention

The present invention relates to a fixing device, and more particularly, to a fixing device for an extension card.

2. Background of the Invention

An electronic apparatus, such as a personal computer, is composed of a main board, various extension cards, a casing, and so on. The main board and the extension cards are disposed in the casing. The main board has a number of connectors. Each of the extension cards (such as a video card or a sound card) has a circuit board and a bracket. The circuit board of each extension card is electrically connected to a corresponding connector of the main board. The bracket of each extension card is fixed on the casing, so as to achieve an electrical connection between the circuit board of each extension card and a corresponding connector.

A conventional way to fix a bracket of an extension card on a casing is by using a screw. The head of the screw presses on the bracket, and the thread portion of the screw is fastened in a screw hole of the casing, thereby retaining the bracket on the casing.

To install or to take apart the screw, a user has to use a tool that matches the screw, causing an inconvenience to the user. Additionally, because the screw is very small, it is very inconvenient and time-consuming to install the screw to the casing or to take the screw from the casing, and the screw is easily lost after being taken out. Moreover, the screw can easily fall onto the main board in the process of being installed or taken apart, causing the electronic apparatus to be damaged due to a short circuit occurring on the main board. Furthermore, the need for the screw increases the cost of the components of the electronic apparatus.

SUMMARY OF THE INVENTION

The primary object of the invention is therefore to provide a fixing device for an extension card to ensure that the extension card is capable of being retained in or dismounted from a casing of an electronic apparatus easily and quickly, to ensure that the installation or the disassembly of the extension card does not cause a breakdown of the electronic apparatus, and to decrease the cost of the components of the electronic apparatus.

According to the claimed invention, an exemplary embodiment of the extension card has a bracket with a bent portion. The fixing device comprises a casing and a metal pressing member. The casing has a support portion. The metal pressing member has a longitudinal bottom plate, a longitudinal side plate, a pivotal structure, and a resilient latching structure. The longitudinal side plate is integrally connected with a longitudinal side edge of the longitudinal bottom plate. The pivotal structure and the resilient latching structure are integrally connected with two ends of the longitudinal bottom plate, respectively. The pivotal structure is pivotally connected to the casing. The bent portion of the bracket of the extension card is placed on the support portion of the casing. The longitudinal bottom plate of the metal pressing member presses on the bent portion. The resilient latching structure of the metal pressing member detachably latches onto the casing.

The pivotal structure is pivotally connected to the casing of an electronic apparatus, the longitudinal bottom plate presses on the bent portion of the bracket of the extension card on the support portion of the casing, and the resilient latching structure latches onto the casing, so that the extension card is capable of being retained in or dismounted from the casing of the electronic apparatus easily and quickly.

Additionally, as the pivotal structure of the metal pressing member is pivotally connected to the casing, the metal pressing member will not fall off from the casing. Therefore, the installation or the disassembly of the extension card will not cause a breakdown of the electronic apparatus.

Moreover, screws are not necessary to retain the extension card, so that the cost of the components of the electronic apparatus is decreased.

To provide a further understanding of the invention, the following detailed description illustrates embodiments and examples of the invention. Examples of the more important features of the invention thus have been summarized rather broadly in order that the detailed description thereof that follows may be better understood, and in order that the contributions to the art may be appreciated. There are, of course, additional features of the invention which will be described hereinafter and which will form the subject of the claims appended hereto.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE EMBODIMENTS

FIGS. 1-5 show a first embodiment of the present invention. The present invention provides a fixing device for an extension card. The fixing device comprises a casing 1 and a metal pressing member 2.

The casing 1 is a casing of an electronic apparatus (such as a personal computer). The electronic apparatus has a main board (not shown). The main board is received in the casing 1. Only a part of the casing 1 is shown in FIGS. 1-5. The casing 1 has a support portion 10, a slot 11, and an insertion hole 12. The support portion 10 is disposed above the slot 11, and the insertion hole 12 is disposed under the slot 11. The support portion 10 has a positioning hole 101. In this embodiment, the casing 1 has two protruding shafts 13 and a hook tab 14. The protruding shafts 13 and the hook tab 14 are arranged at two ends of the support portion 10.

The metal pressing member 2 is formed from a metal thin plate and has a longitudinal bottom plate 20, a longitudinal side plate 21, a pivotal structure 28 and a resilient latching structure 27. The longitudinal bottom plate 20 has a resilient tab 201 and a positioning tab 202. The resilient tab 201 and the positioning tab 202 extend under the longitudinal bottom plate 20. The longitudinal side plate 21 is integrally connected with a longitudinal side edge of the longitudinal bottom plate 20 to enhance the strength of the metal pressing member 2. The longitudinal side plate 21 has an upper-bent plate 211 disposed on an upper edge thereof to enhance the strength of the metal pressing member 2 and to prevent a user's hand from being hurt by the longitudinal side plate 21. The pivotal structure and the resilient latching structure are integrally connected with two ends of the longitudinal bottom plate 20, respectively. The metal pressing member 2 further has a hanging tab 22. The hanging tab 22 is perpendicular to the longitudinal bottom plate 20 of the metal pressing member 2 and extends downward.

In this embodiment, the pivotal structure of the metal pressing member 2 has two lateral ear portions 23. The lateral ear portions 23 are integrally connected with one end of the longitudinal bottom plate 20. Each of the lateral ear portions 23 has a pivotal hole 231. The resilient latching structure of the metal pressing member 2 has a resilient arm 24 and a latching portion 25. The resilient arm 24 has a bottom end integrally connected with the other end of the longitudinal bottom plate 20. The resilient arm 24 has a top end slanting outward along a longitudinal direction of the longitudinal bottom plate 20. Additionally, the resilient arm 24 has a pull portion 241. The latching portion 25 is integrally connected with the top end of the resilient arm 24. The latching portion 25 has an inner-bent portion 251 and an upper-bent portion 252. The inner-bent portion 251 extends from the top end of the resilient arm 24 toward the pivotal structure. The upper-bent portion 252 extends upward from the inner-bent portion 251. Additionally, the longitudinal side plate 21 has a stop portion 212. The stop portion 212 is disposed inside the upper-bent portion 252 of the latching portion 25 to stop the upper-bent portion 252. As such, the moving range of the resilient latching structure is limited.

The pivotal holes 231 of the lateral ear portions 23 are pivotally connected to the protruding shafts 13, respectively, so that the pivotal structure is pivotally connected to the casing 1. Therefore, the metal pressing member 2 is pivotally connected to the casing 1 and is unable to fall off from the casing 1.

The extension card 3 can be a video card, a sound card, and so on. The extension card 3 has a circuit board 30 and a bracket 31. The circuit board 30 has an electrical contact portion 301 and a connection port (not shown). The bracket 31 has a body portion 311, a bent portion 312, and an insertion tab 313. The bent portion 312 is disposed at a top end of the body portion 311 and has a notch 314. The body portion 311 is perpendicular to the bent portion 312 and has a connection hole (not shown) corresponding to the connection port of the circuit board 30. The insertion tab 313 is disposed at a bottom end of the body portion 311.

The electronic apparatus has a main board with a number of connectors. When the extension card 3 is installed, the electrical contact portion 301 of the circuit board 30 of the extension card 3 is first inserted into a corresponding connector, and the insertion tab 313 of the bracket 31 of the extension card 3 is positioned in the insertion hole 12 of the casing 1. Meanwhile, the body portion 311 of the bracket 31 corresponds to the slot 11 of the casing 1, and the bent portion 312 of the bracket 31 is placed on the support portion 10 of the casing 1. Next, the longitudinal bottom plate 20 of the metal pressing member 2 presses on the bent portion 312, and the latching portion 25 latches onto the hook tab 14, so that the resilient latching structure of the metal pressing member 2 detachably latches onto the casing 1. Therefore, the bent portion 312 of the bracket 31 of the extension card 3 is reliably clipped between the support portion 10 of the casing 1 and the metal pressing member 2 to achieve an electrical connection between the electrical contact portion 301 of the circuit board 30 of the extension card 3 and the corresponding connector.

In addition, the positioning tab 202 of the longitudinal bottom plate 20 is inserted into the positioning hole 101 of the support portion 10, so that the longitudinal bottom plate 20 is positioned precisely and the metal pressing member 2 is firm. Moreover, the hanging tab 22 of the metal pressing member 2 hooks onto the body portion 311 of the bracket 31 of the extension card 3, so that the bracket 31 is retained firmly. The resilient tab 201 of the longitudinal bottom plate 20 contacts the bent portion 312 of the bracket 31 of the extension card 3 to obtain an electromagnetic shielding effect.

Furthermore, due to the characteristic of the metal thin plate, the metal pressing member 2 has a small volume and a strong clipping force. As such, the metal pressing member 2 only occupies a small space in the casing 1, and can reliably retain a number of extension cards 3 to the casing 1.

The support portion 10 of the casing 1 can further have a screw hole 102, and the longitudinal bottom plate 20 of the metal pressing member 2 can further have an aperture 203. A screw 4 penetrates through the aperture 203. A head of the screw 4 presses on the bracket 31, and a thread portion of the screw 4 penetrates through the notch 314 and fastened in the screw hole 102. Therefore, the fixing device for an extension card of the present invention also allows the screw 4 to retain the extension card 3.

Figure 1:
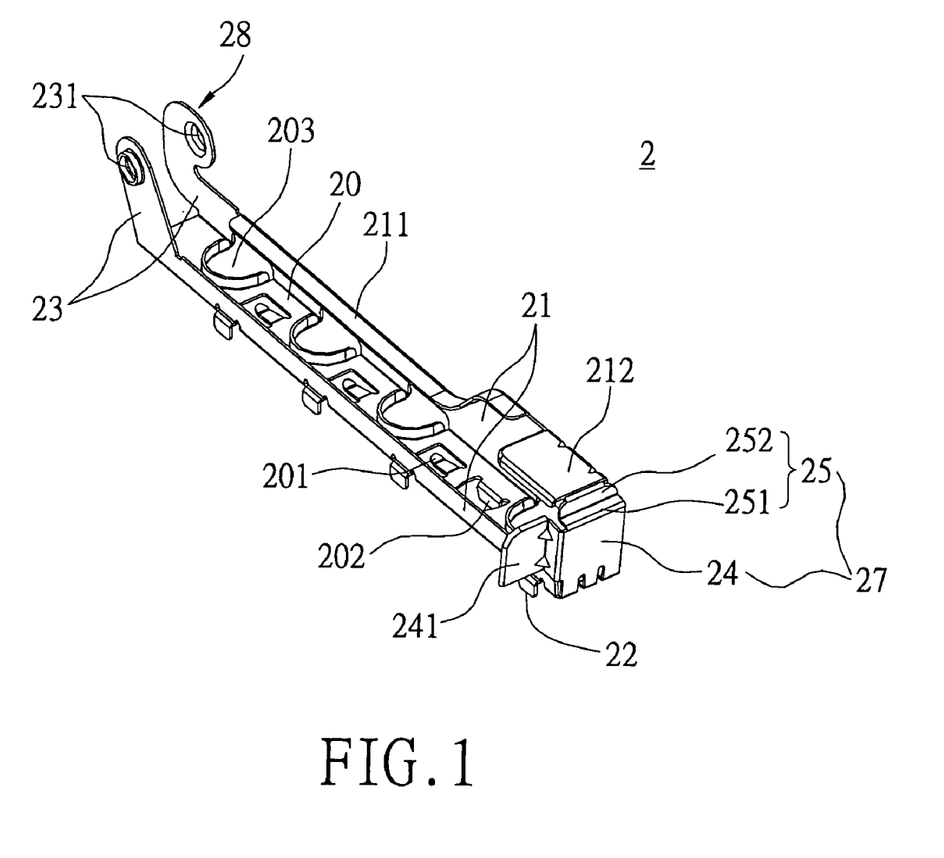
FIG. 1 is a perspective view of a metal pressing member of a first embodiment of a fixing device for an extension card of the present invention.
Figure 2:
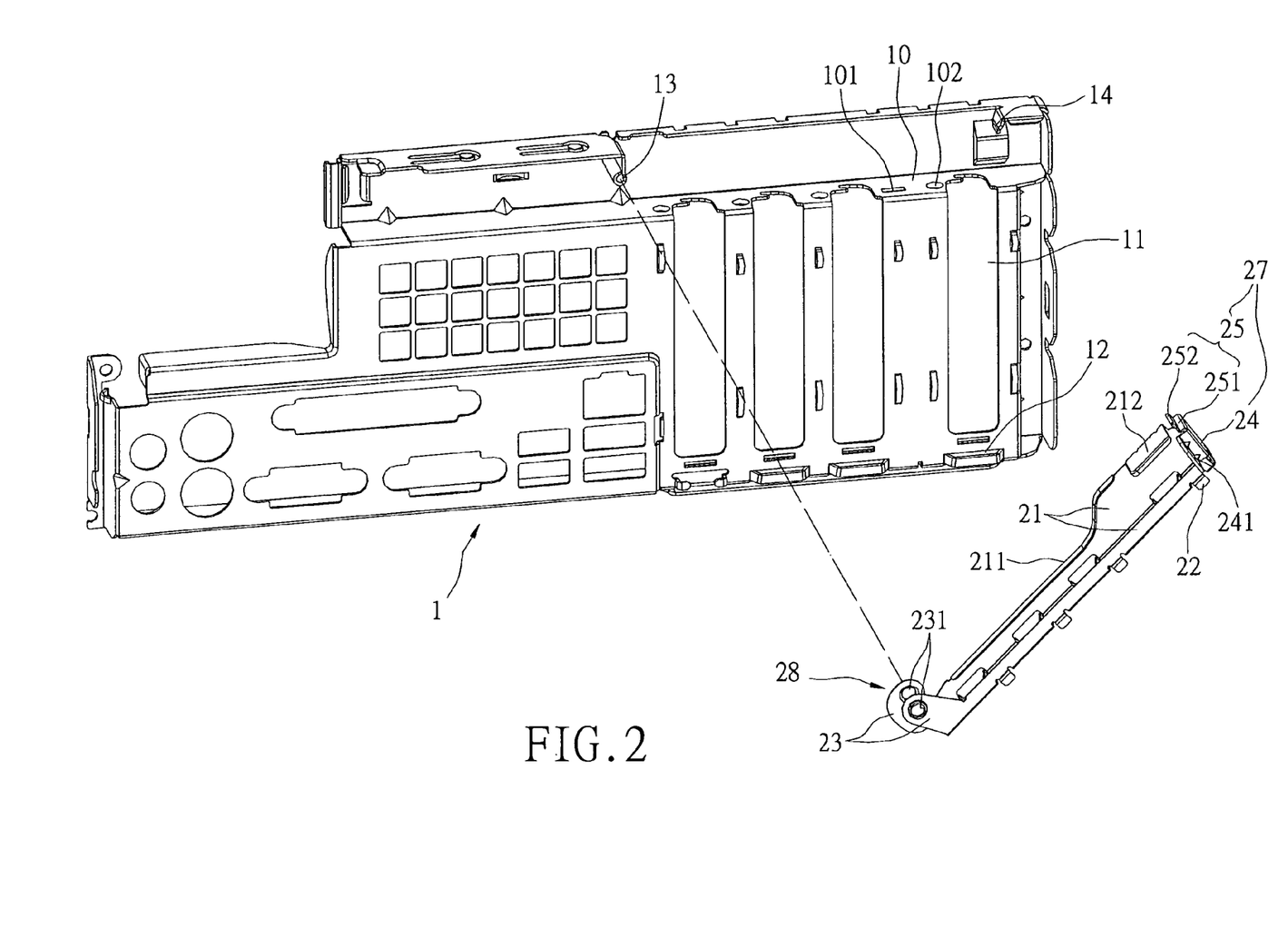
FIG. 2 is an exploded perspective view of a first embodiment of a fixing device for an extension card of the present invention.
Figure 3:
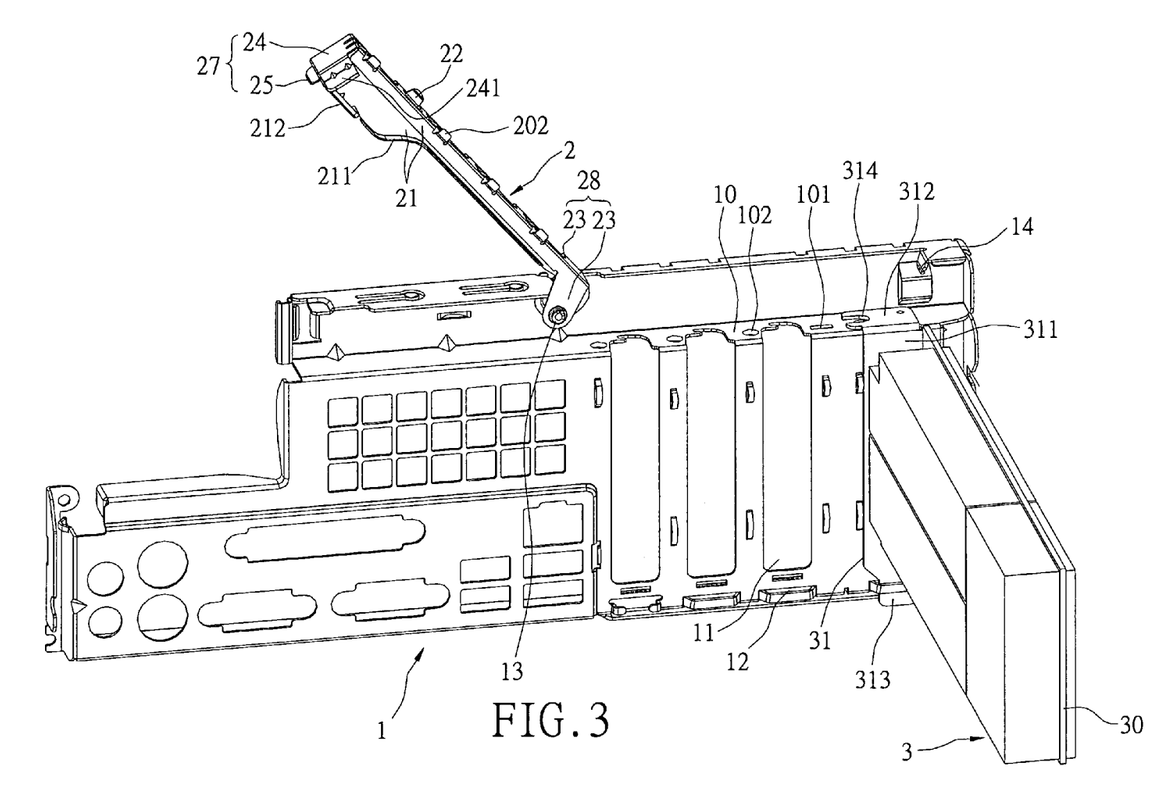
FIG. 3 is an assembled perspective view of a first embodiment of a fixing device for an extension card of the present invention, wherein a bent portion of a bracket of an extension card is placed on a casing of the fixing device.
Figure 4:
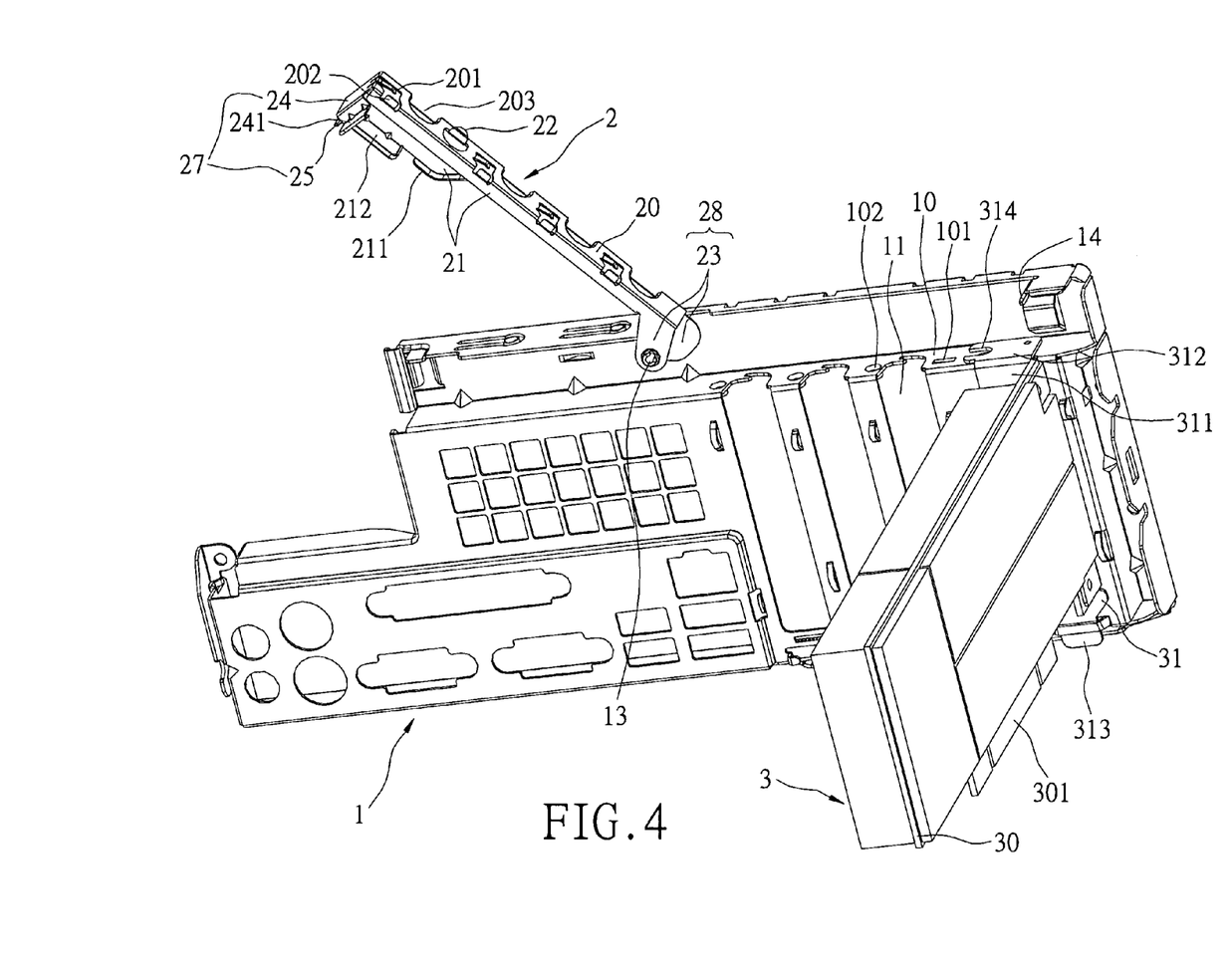
FIG. 4 is another assembled perspective view of a first embodiment of a fixing device for an extension card of the present invention, wherein a bent portion of a bracket of an extension card is placed on a casing of the fixing device.
Figure 5:
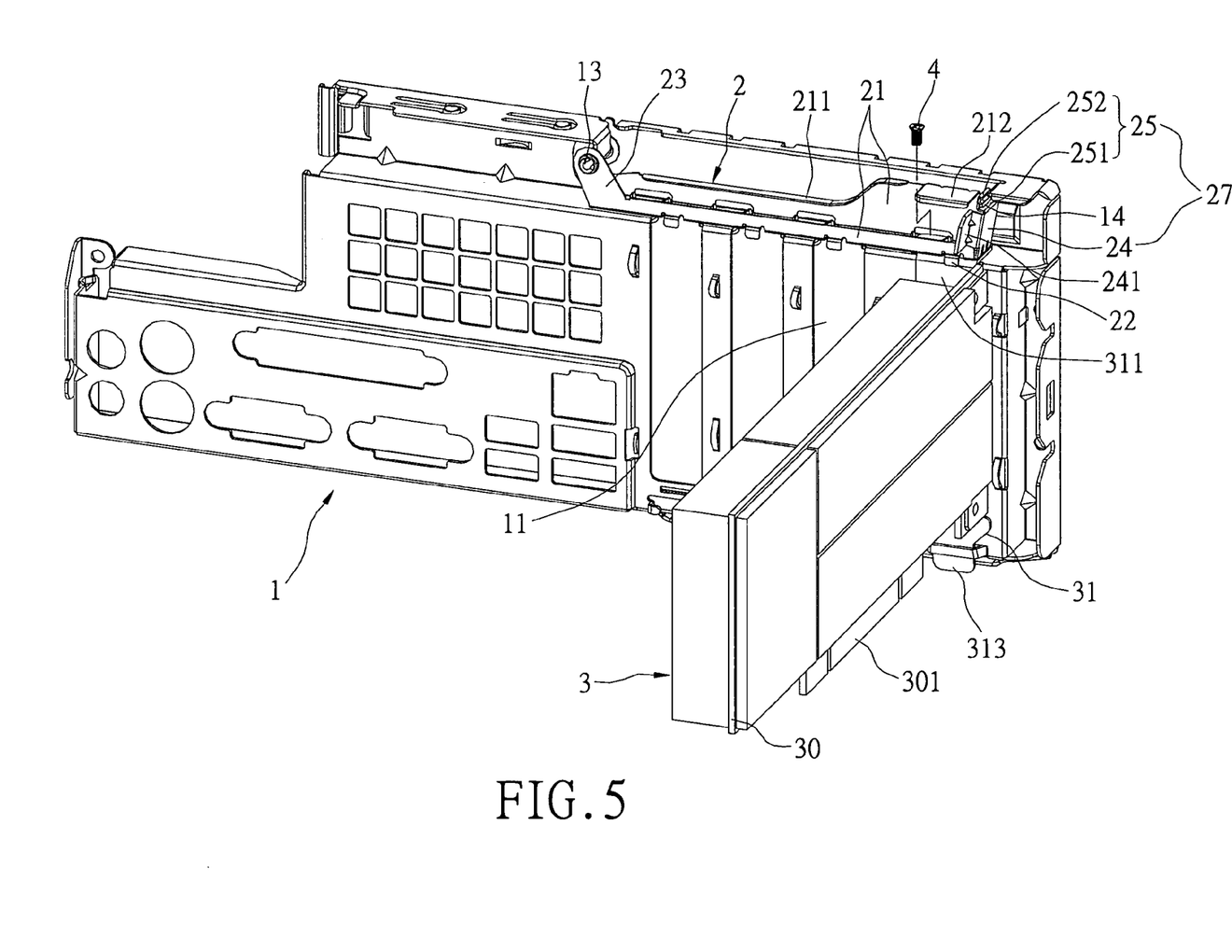
FIG. 5 is still another assembled perspective view of a first embodiment of a fixing device for an extension card of the present invention, wherein a bent portion of a bracket of an extension card is placed on a casing of the fixing device, and a metal pressing member of the fixing device presses on the bent portion of the bracket of the extension card.
Figure 6:
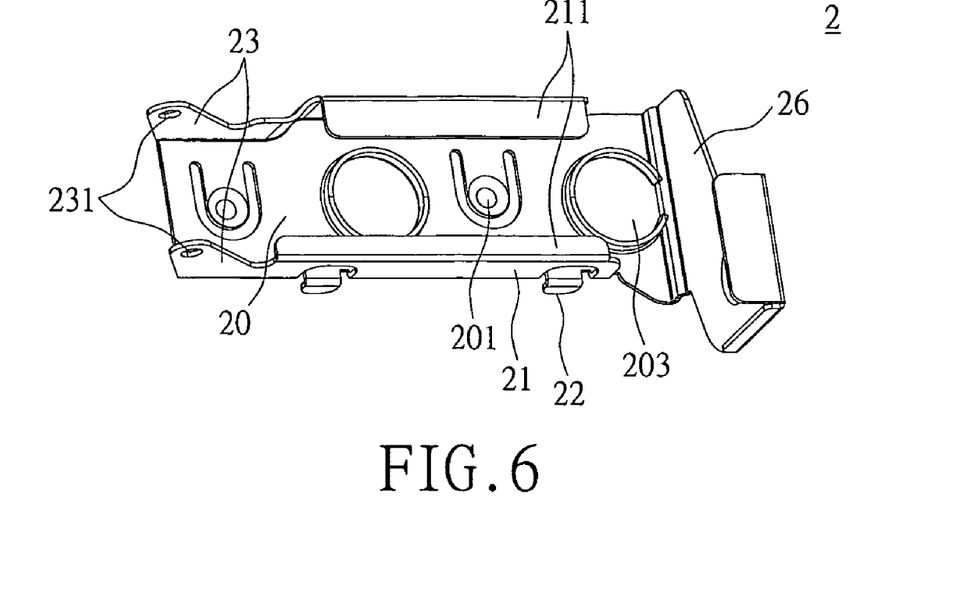
FIG. 6 is a perspective view of a metal pressing member of a second embodiment of a fixing device for an extension card of the present invention.
Figure 7:
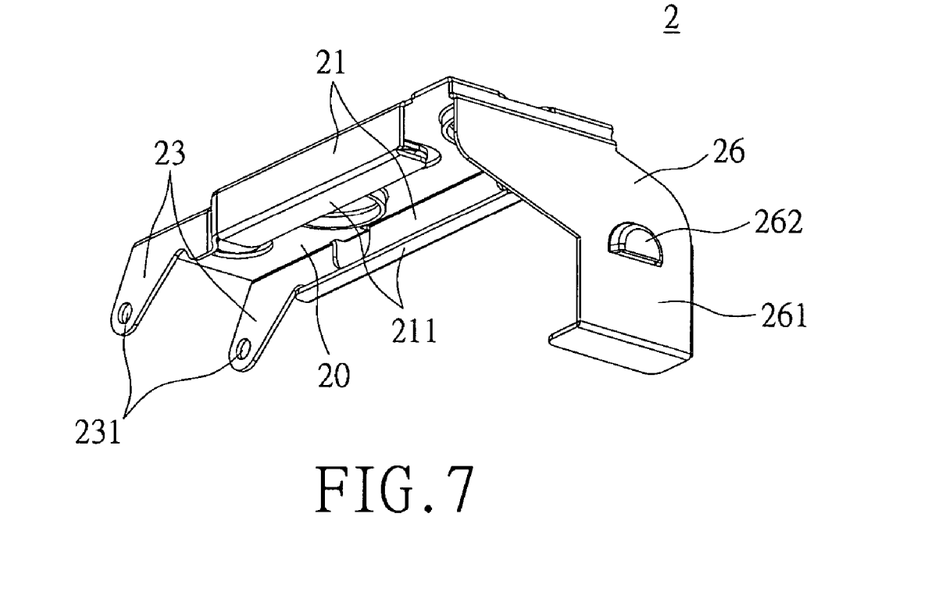
FIG. 7 is another perspective view of a metal pressing member of a second embodiment of a fixing device for an extension card of the present invention.
Figure 8:
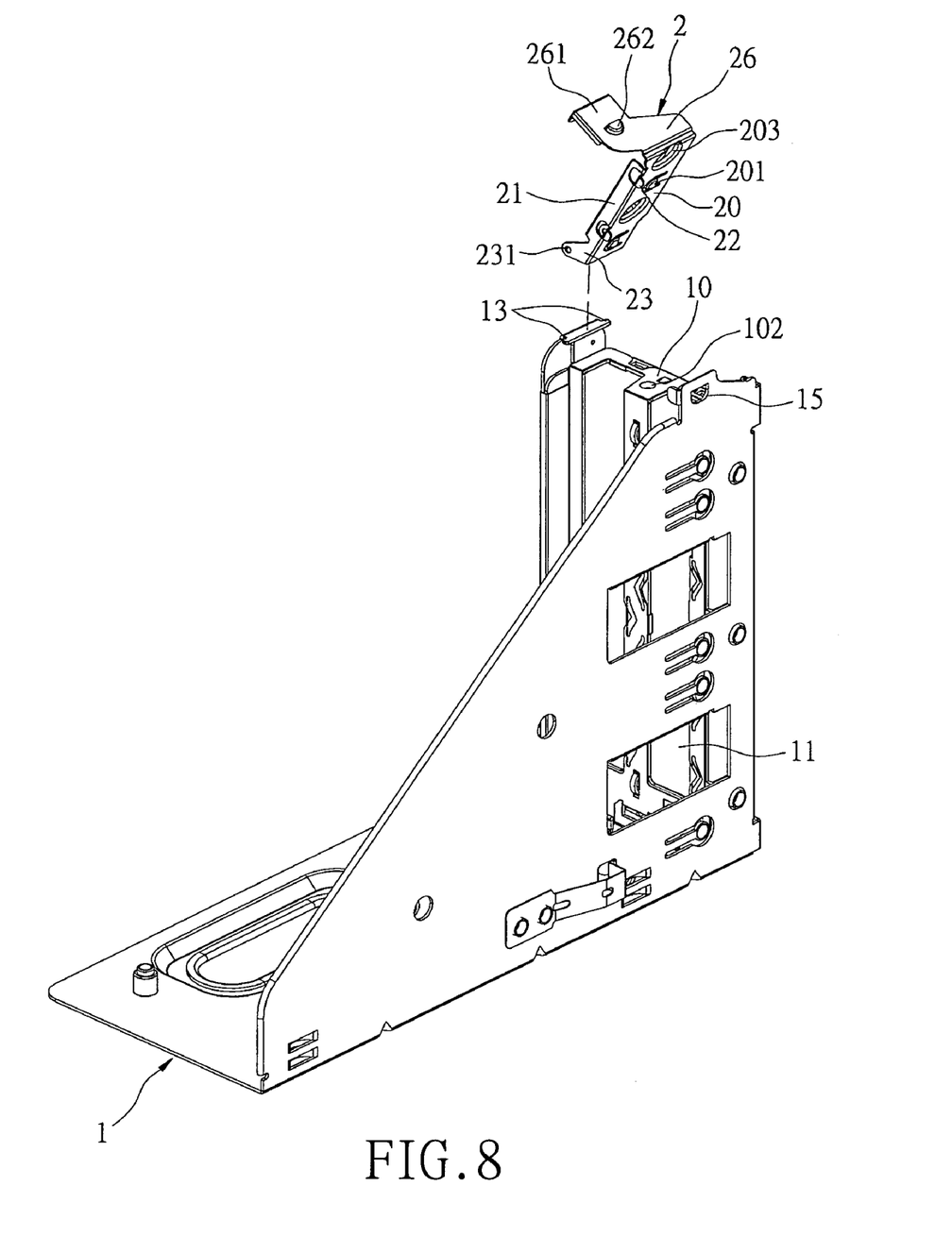
FIG. 8 is an exploded perspective view of a second embodiment of a fixing device for an extension card of the present invention.
Figure 9:
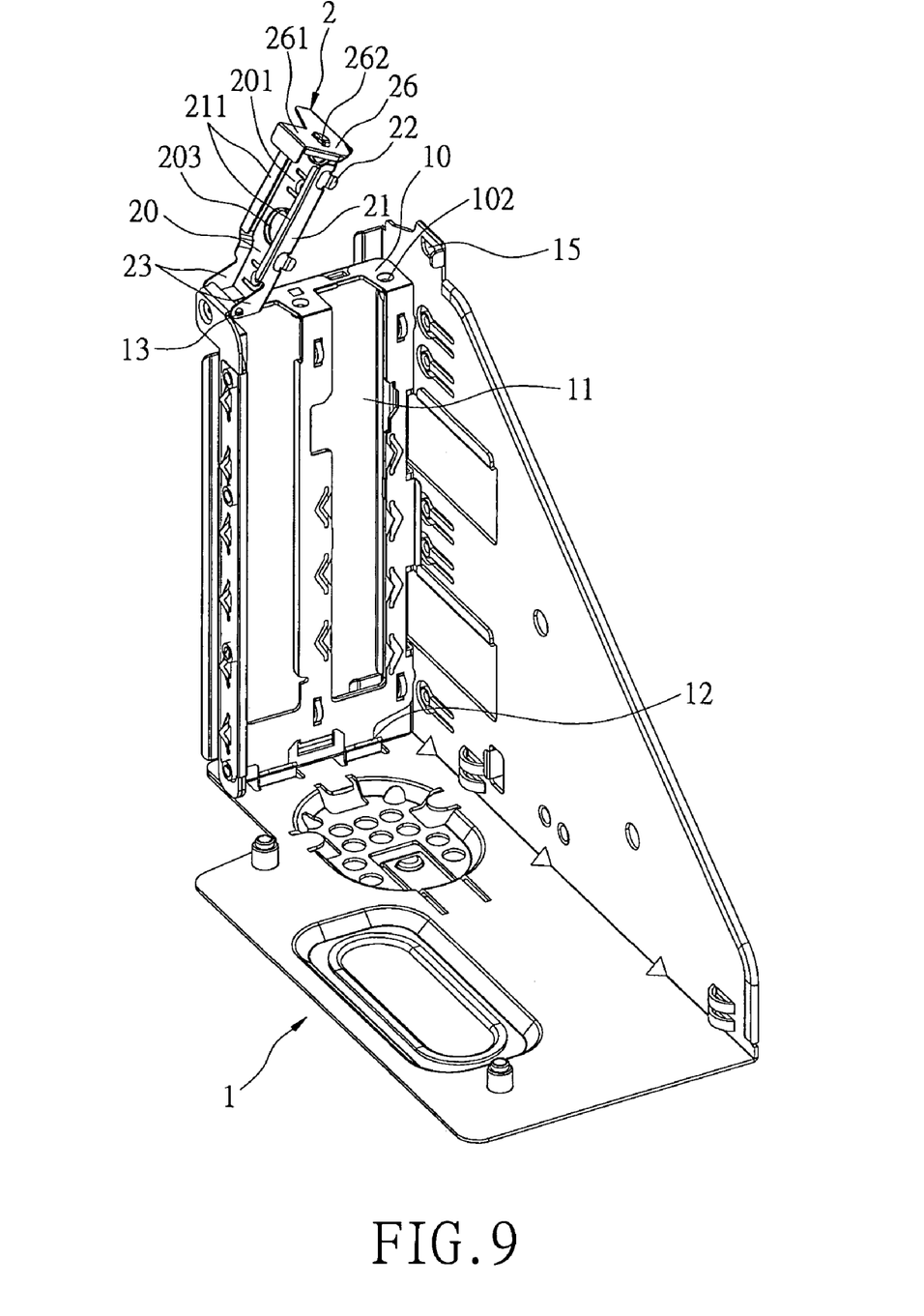
FIG. 9 is an assembled perspective view of a second embodiment of a fixing device for an extension card of the present invention.
Figure 10:
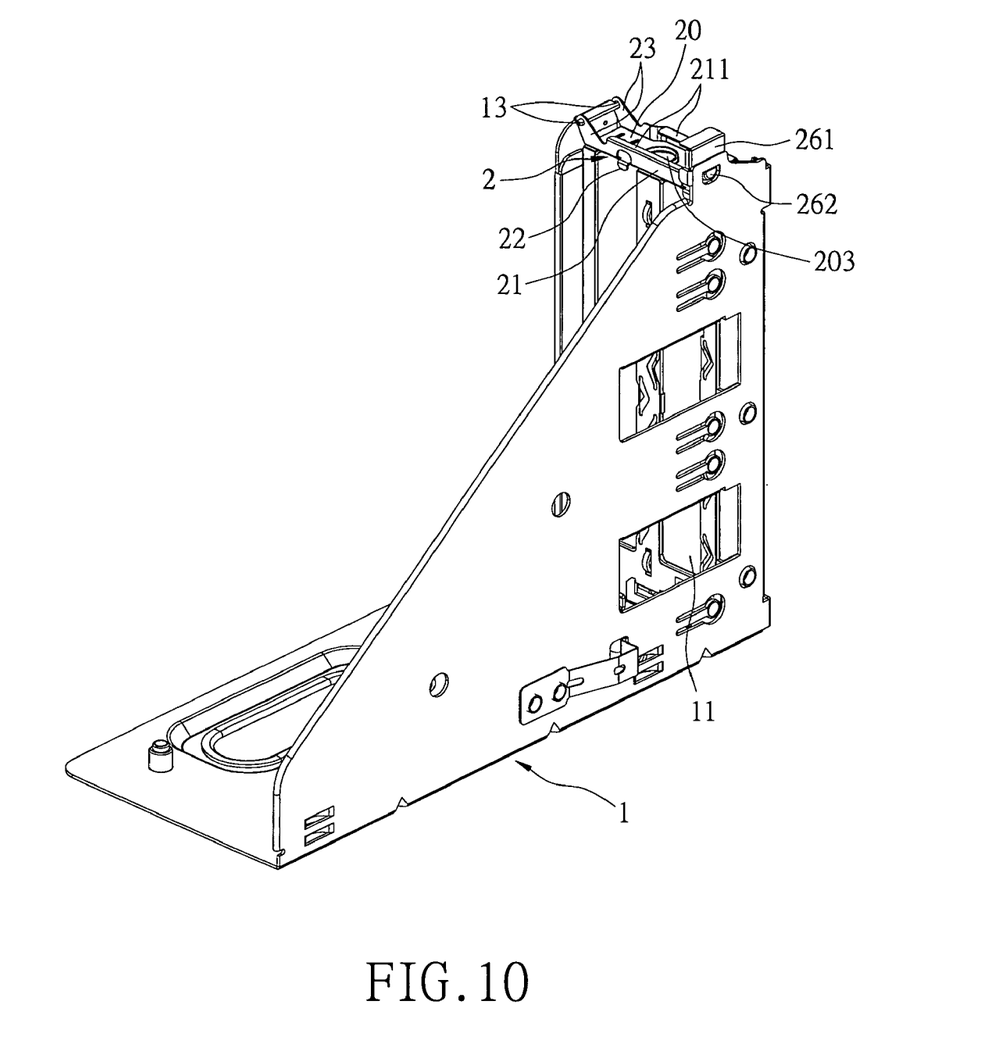
FIG. 10 is another assembled perspective view of a second embodiment of a fixing device for an extension card of the present invention.

When the extension card 3 is disassembled, the pull portion 241 of the resilient latching structure is pulled, so that the latching portion 25 is departed from the hook tab 14, so that the resilient latching structure is departed from the casing 1.

The fixing device for an extension card of the present invention uses the metal pressing member 2 to retain the bent portion 312 of the bracket 31 of the extension card 3 on the support portion 10 of the casing 1. The installation and the disassembly of the extension card 3 does not require any tools or screws. Therefore, the extension card 3 is capable of being retained in or dismounted from the casing 1 easily and quickly. In addition, the metal pressing member 2 will not fall off from the casing 1. Therefore, the installation or the disassembly of the extension card 3 will not cause a breakdown of the electronic apparatus. Moreover, screws are not necessary to retain the extension card 3. Therefore, the cost of the components of the electronic apparatus is decreased.

FIGS. 6-10 show a second embodiment of the present invention. The difference between the second embodiment and the first embodiment is the resilient latching structure. In the second embodiment, the casing 1 has a latching hole 15, the resilient latching structure has a resilient arm 26, and the resilient arm 26 has a pull portion 261 and a projection 262. The projection 262 of the resilient arm 26 latches in the latching hole 15 of the casing 1, so that the resilient latching structure latches onto the casing 1, so that the metal pressing member 2 reliably presses on a bent portion of a bracket of an extension card (not shown) on the support portion 10 of the casing 1.

When the extension card 3 is disassembled, the pull portion 261 of the resilient latching structure is pulled, so that the projection 262 is withdrawn from the latching hole 15, so that the resilient latching structure is departed from the casing 1.

As indicated above, the fixing device for an extension card of the present invention has the following advantages:

1. The pivotal structure is pivotally connected to the casing of the electronic apparatus, the longitudinal bottom plate presses on the bent portion of the bracket of the extension card on the support portion of the casing, and the resilient latching structure latches onto the casing, so that the extension card is capable of being retained in or dismounted from the casing of the electronic apparatus easily and quickly.

2. The pivotal structure of the metal pressing member is pivotally connected to the casing, so that the metal pressing member will not fall off from the casing. Therefore, the installation or the disassembly of the extension card will not cause a breakdown of the electronic apparatus.

3. Screws are not necessary to retain the extension card, so that the cost of the components of the electronic apparatus is decreased.

4. The metal pressing member is formed from a metal thin plate. Therefore, the metal pressing member has a small volume and a strong clipping force. As such, the metal pressing member only occupies a small space in the casing, and can reliably retain a number of extension cards to the casing.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A fixing device for an extension card having a bracket with a bent portion and a body portion, the fixing device comprising:
    a metal pressing member having first and second opposing ends, comprising
        a pivotal structure on the first end of the metal pressing member, and
        a resilient latching structure on the second end of the metal pressing member, the resilient latching structure having a latching portion, and
    a casing having a support portion, the support portion having a hook tab and at least one protruding shaft respectively corresponding to the resilient latching structure and the pivotal structure, so that the resilient latching structure of the metal pressing member detachably latches onto the casing, and the pivotal structure is pivotally connected to the casing.

2. The fixing device as claimed in claim 1, wherein the support portion of the casing has a screw hole, the metal pressing member having a bottom plate that has an aperture, the bent portion of the bracket of the extension card has a notch, a screw is penetrated through the aperture, a head of the screw presses on the bracket, and a thread portion of the screw is penetrated through the notch and fastened in the screw hole.

3. The fixing device as claimed in claim 1, wherein the metal pressing member has a bottom plate that has a resilient tab, and the resilient tab contacts the bent portion of the bracket of the extension card.

4. The fixing device as claimed in claim 1, wherein the support portion of the casing has a positioning hole, the metal pressing member has a bottom plate that has a positioning tab, and the positioning tab is inserted into the positioning hole.

5. The fixing device as claimed in claim 1, wherein the metal pressing member has a hanging tab, the hanging tab is perpendicular to a bottom plate of the metal pressing member and extends downward, the body of the extension card being perpendicular to the bent portion of the extension card, and the hanging tab hooks onto the body portion.

6. The fixing device as claimed in claim 1, wherein the metal pressing member has an upper-bent plate disposed on an upper edge thereof.

7. The fixing device as claimed in claim 1, wherein the at least one protruding shaft of the casing comprises two protruding shafts, the pivotal structure of the metal pressing member has two lateral ear portions, each of the lateral ear portions has a pivotal hole, and the pivotal holes are pivotally connected to the protruding shafts, respectively.

8. The fixing device as claimed in claim 1, wherein the resilient latching structure further has a resilient arm having a bottom end integrally connected with a bottom plate of the metal pressing member, the resilient arm has a top end slanting outward along a longitudinal direction of the bottom plate, the latching portion is integrally connected with the top end of the resilient arm, and the latching portion latches onto the hook tab.

9. The fixing device as claimed in claim 8, wherein the resilient arm has a pull portion.

10. The fixing device as claimed in claim 8, wherein the latching portion has an inner-bent portion and an upper-bent portion, the inner-bent portion extends from the top end of the resilient arm toward the pivotal structure, and the upper-bent portion extends upward from the inner-bent portion.

11. The fixing device as claimed in claim 10, wherein the side plate has a stop portion, and the stop portion is disposed inside the upper-bent portion of the latching portion.

12. The fixing device as claimed in claim 1, wherein the casing has a latching hole, the resilient latching structure has a resilient arm, the resilient arm has a projection, and the projection latches in the latching hole.

13. The fixing device as claimed in claim 12, wherein the resilient arm has a pull portion.

14. A fixing device for an extension card having a bracket with a bent portion and a body portion, the fixing device comprising:
    a casing having a support portion; and
    a metal pressing member having a longitudinal bottom plate, a longitudinal side plate, a pivotal structure, a hanging tab that hooks onto the body portion of the extension card, and a resilient latching structure, the side plate being integrally connected with a longitudinal side edge of the bottom plate, the pivotal structure, the hanging tab, and the resilient latching structure being integrally connected with two ends of the bottom plate, respectively, and the pivotal structure being pivotally connected to the casing; wherein the bent portion of the bracket of the extension card is placed on the support portion of the casing, the bottom plate of the metal pressing member presses on the bent portion, and the resilient latching structure of the metal pressing member detachably latches onto the casing.

15. The fixing device as claimed in claim 14, wherein the hanging tab is perpendicular to the bottom plate of the metal pressing member and extends downward.

16. The fixing device as claimed in claim 14, wherein the resilient latching structure has a resilient arm that has a bottom end integrally connected with the bottom plate of the metal pressing member, the resilient arm has a top end slanting outward along a longitudinal direction of the bottom plate, and a latching portion is integrally connected with the top end of the resilient arm to latch onto the hook tab.

17. The fixing device as claimed in claim 16, wherein the side plate has a stop portion, and the stop portion is disposed inside an upper-bent portion of the latching portion.

18. The fixing device as claimed in claim 16, wherein the latching portion has an inner-bent portion and an upper-bent portion, the inner-bent portion extends from the top end of the resilient arm toward the pivotal structure, and the upper-bent portion extends upward from the inner-bent portion.

19. The fixing device as claimed in claim 16, wherein the casing has a latching hole, the resilient arm has a projection, and the projection latches in the latching hole.

* * * * *